United States Patent
Petrarca et al.

(10) Patent No.: US 9,951,895 B2
(45) Date of Patent: Apr. 24, 2018

(54) TWO-PIECE SELF-LOCKING MECHANISM FOR TUBE ASSEMBLIES

(71) Applicant: United Technologies Corporation, Hartford, CT (US)

(72) Inventors: Brian Petrarca, Glastonbury, CT (US); Richard M. Murphy, East Hampton, CT (US); Jose Cardiel, Moorpark, CA (US); Brittany Zabinski, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 860 days.

(21) Appl. No.: 14/189,102

(22) Filed: Feb. 25, 2014

(65) Prior Publication Data
US 2014/0252764 A1    Sep. 11, 2014

Related U.S. Application Data

(60) Provisional application No. 61/775,994, filed on Mar. 11, 2013.

(51) Int. Cl.
| | | |
|---|---|---|
| F16L 15/08 | (2006.01) | |
| F16L 37/098 | (2006.01) | |
| F16L 37/14 | (2006.01) | |

(52) U.S. Cl.
CPC ............ *F16L 15/08* (2013.01); *F16L 37/098* (2013.01); *F16L 37/148* (2013.01)

(58) Field of Classification Search
CPC ........ F16L 37/098; F16L 37/148; F16L 15/08

USPC ........................................................... 285/330
See application file for complete search history.

(56) References Cited

U.S. PATENT DOCUMENTS

| | | | |
|---|---|---|---|
| 1,996,751 A * | 4/1935 | Dillhoefer ............ | B65D 39/084 285/206 |
| 2,390,103 A | 12/1945 | Johnson | |
| 2,491,406 A | 12/1949 | Zeeb | |
| 2,954,246 A * | 9/1960 | Totah ...................... | F02K 9/343 285/330 |
| 3,390,900 A | 7/1968 | McCormick et al. | |
| 3,575,446 A * | 4/1971 | Brantley .................. | F16B 7/105 285/317 |
| 3,971,614 A | 7/1976 | Paoli et al. | |
| 4,295,666 A | 10/1981 | Melanson | |
| 4,422,675 A | 12/1983 | Norris et al. | |
| 4,697,947 A * | 10/1987 | Bauer ................... | E21B 17/046 285/305 |
| 4,927,187 A | 5/1990 | Sanford et al. | |
| 5,156,421 A | 10/1992 | Chauvel | |
| 5,215,336 A | 6/1993 | Worthing | |
| 5,372,393 A | 12/1994 | Austin | |

(Continued)

FOREIGN PATENT DOCUMENTS

WO    2011/062847 A1    5/2011

*Primary Examiner* — David E Bochna
*Assistant Examiner* — James A Linford
(74) *Attorney, Agent, or Firm* — Carlson, Gaskey & Olds, P.C.

(57) ABSTRACT

A fitting for connecting tubular assemblies includes a base member defining a first bore configured to receive a tube therein. A retaining band defines a second bore for receiving a portion of the base member. The retaining band defines an engagement feature on a radially outward surface configured to engage a locking mechanism of a fastening member.

8 Claims, 3 Drawing Sheets

(56) References Cited

U.S. PATENT DOCUMENTS

| | | |
|---|---|---|
| 5,474,473 A | 12/1995 | Perretta et al. |
| 5,823,702 A | 10/1998 | Bynum |
| 5,882,044 A | 3/1999 | Sloane |
| 6,557,900 B1 | 5/2003 | Austin |
| 6,857,665 B2 | 2/2005 | Vyse et al. |
| 7,156,424 B2 | 1/2007 | McCord |
| 7,571,937 B2 | 8/2009 | Patel |
| 7,600,789 B2 | 10/2009 | Vyse et al. |
| 7,922,217 B2 | 4/2011 | Williams et al. |
| 2007/0164566 A1 | 7/2007 | Patel |
| 2013/0147182 A1* | 6/2013 | Murphy ................ F16L 19/005 285/81 |

* cited by examiner

TWO-PIECE SELF-LOCKING MECHANISM FOR TUBE ASSEMBLIES

CROSS REFERENCE TO RELATED APPLICATIONS

This application claims priority to U.S. Provisional Application No. 61/775,994 filed on Mar. 11, 2013. Cross reference is made to copending U.S. application Ser. No. 12/323,972 entitled "FERRULE."

BACKGROUND

This disclosure relates to tube assemblies, and more particularly to tube assemblies for aerospace and gas turbine engine applications.

Tube assemblies generally include at least one fitting for fastening or joining two tubes to each other. Common types of fittings include ferrules, elbows, t-connectors and union crosses. Fittings used for joining tubes are commonly made of metal and are engaged by a locking mechanism, such as a nut. When a fitting joins two tubes, one tube mechanically attaches to an end of the fitting and the other tube usually requires a coupling device to secure to the other end of the fitting.

Fittings used in aerospace applications also typically require a locking mechanism to ensure the nut stays engaged to the fitting and does not unintentionally loosen (due to vibrations, wear or other causes). One type of locking mechanism includes a lockwire. Lockwire is a braided wire that may be connected to the fitting and to a nut and/or to another object (coupling member, tube, etc.) to prevent relative rotation. The usage of lockwire generally requires additional space, and in some cases is difficult to repair or install, making lockwire ergonomically undesirable. Moreover a break in one or more of the braids of the lockwire may allow the coupling member to disengage.

SUMMARY

A fitting for connecting tubular assemblies, according to an exemplary aspect of the present disclosure includes, among other things, a base member. The base member includes a first end and a second end, and the base member defines a first bore configured to receive a tube therein. A retaining band defines a second bore for receiving a portion of the base member. The retaining band defines an engagement feature on a radially outward surface configured to engage a locking mechanism of a fastening member.

In a further non-limiting embodiment of the foregoing fitting for connecting tubular assemblies, the engagement feature includes a plurality of pockets extending radially inward and spaced circumferentially around the outward surface of the retaining band.

In a further non-limiting embodiment of either of the foregoing fittings for connecting tubular assemblies, the engagement feature includes a plurality of raised protrusions extending radially outward and spaced circumferentially around the outward surface of the retaining band.

In a further non-limiting embodiment of any of the foregoing fittings for connecting tubular assemblies, the engagement feature includes a plurality of raised protrusions extending radially outward and spaced circumferentially around the outward surface of the retaining band.

In a further non-limiting embodiment of any of the foregoing fittings for connecting tubular assemblies, the engagement feature is symmetric about a longitudinal axis.

In a further non-limiting embodiment of any of the foregoing fittings for connecting tubular assemblies, the base member defines a locating feature and the retaining band includes a key configured to be inserted into the locating feature to minimize relative rotation between the retaining band and the base member.

In a further non-limiting embodiment of any of the foregoing fittings for connecting tubular assemblies, an outer surface of the base member includes a second taper extending axially inward from the second end of the base member and is configured to minimize relative axial movement between the base member and the retaining band.

In a further non-limiting embodiment of any of the foregoing fittings for connecting tubular assemblies, the base member includes a first tubular portion located at the first end of the base member and a second tubular portion located at the second end of the base member.

In a further non-limiting embodiment of any of the foregoing fittings for connecting tubular assemblies, the second tubular portion at least partially defines the engagement feature.

In a further non-limiting embodiment of any of the foregoing fittings for connecting tubular assemblies, the base member includes a first material and the retaining band includes a second material different from the first material in hardness.

A tubular assembly according to another exemplary aspect of the present disclosure includes, among other things, a base member. The base member includes a first end and a second end. The base member defines a first bore configured to receive a tube therein. A retaining band defines a second bore for receiving a portion of the base member. The retaining band defines an engagement feature on a radially outward surface. A coupling member is configured to connect to a second tube. A fastening member defines a third bore for receiving a portion of the coupling member. The fastening member includes a locking mechanism configured to engage the engagement feature of the retaining band to minimize relative rotation between the fastening member and the retaining band.

In a further non-limiting embodiment of the foregoing tubular assembly, the engagement feature includes a plurality of pockets extending radially inward and spaced circumferentially around the outward surface of the retaining band.

In a further non-limiting embodiment of either of the foregoing tubular assemblies, the engagement feature includes a plurality of raised protrusions extending radially outward and spaced circumferentially around the outward surface of the retaining band.

In a further non-limiting embodiment of any of the foregoing tubular assemblies, the engagement feature includes a plurality of raised protrusions extending radially outward and spaced circumferentially around the outward surface of the retaining band.

In a further non-limiting embodiment of any of the foregoing tubular assemblies, the engagement feature is symmetric about a longitudinal axis.

In a further non-limiting embodiment of any of the foregoing tubular assemblies, the base member defines a locating feature and the retaining band includes a key configured to be inserted into the locating feature to minimize relative rotation between the retaining band and the base member.

In a further non-limiting embodiment of any of the foregoing tubular assemblies, an outer surface of the base member includes a second taper extending axially inward from the second end of the base member and is configured to minimize relative axial movement between the base member and the retaining band.

In a further non-limiting embodiment of any of the foregoing tubular assemblies, the base member includes a first tubular portion located at the first end of the base member and a second tubular portion located at the second end of the base member.

In a further non-limiting embodiment of any of the foregoing tubular assemblies, the second tubular portion at least partially defines the engagement feature.

In a further non-limiting embodiment of any of the foregoing tubular assemblies, the base member includes a first material and the retaining band includes a second material different from the first material in hardness.

A method of assembling a fitting for tubular assemblies according to another exemplary aspect of the present disclosure includes, among other things, connecting a retaining band to a base member. The retaining band defines an engagement feature on a radially outward surface. A fastening member is connected to a retaining band. The fastening member includes a locking mechanism configured to engage the engagement feature.

In a further non-limiting embodiment of the foregoing method, the engagement feature and the locking mechanism are configured to minimize relative rotation between the fastening member and the retaining band.

In a further non-limiting embodiment of either of the foregoing methods, the base member defines a locating feature and the retaining band includes a key configured to be inserted into the locating feature to minimize relative rotation between the retaining band and the base member.

In a further non-limiting embodiment of any of the foregoing methods, the retaining band is fixedly attached to the base member.

These and other features disclosed herein can be best understood from the following specification and drawings, the following of which is a brief description.

DETAILED DESCRIPTION

Figure 1A:
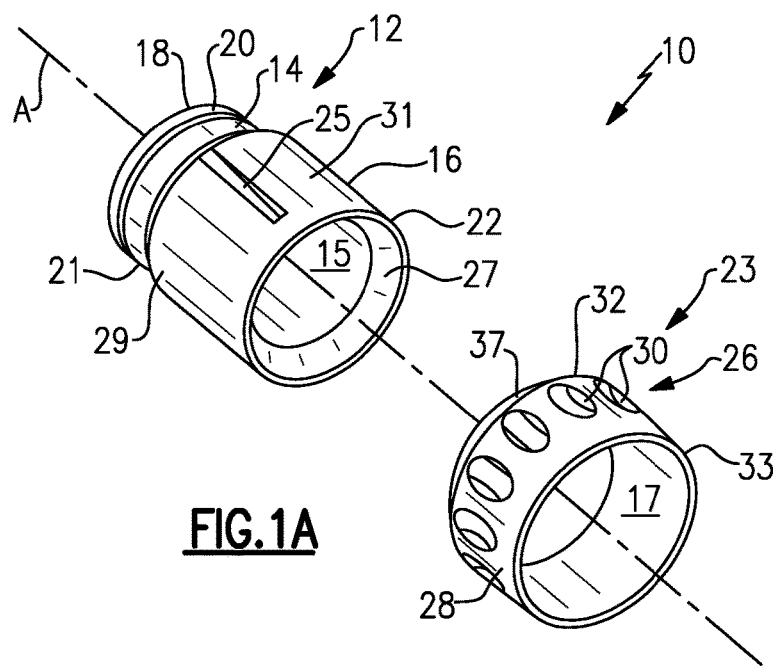
FIG. 1A is a perspective view of a fitting.
Figure 1B:
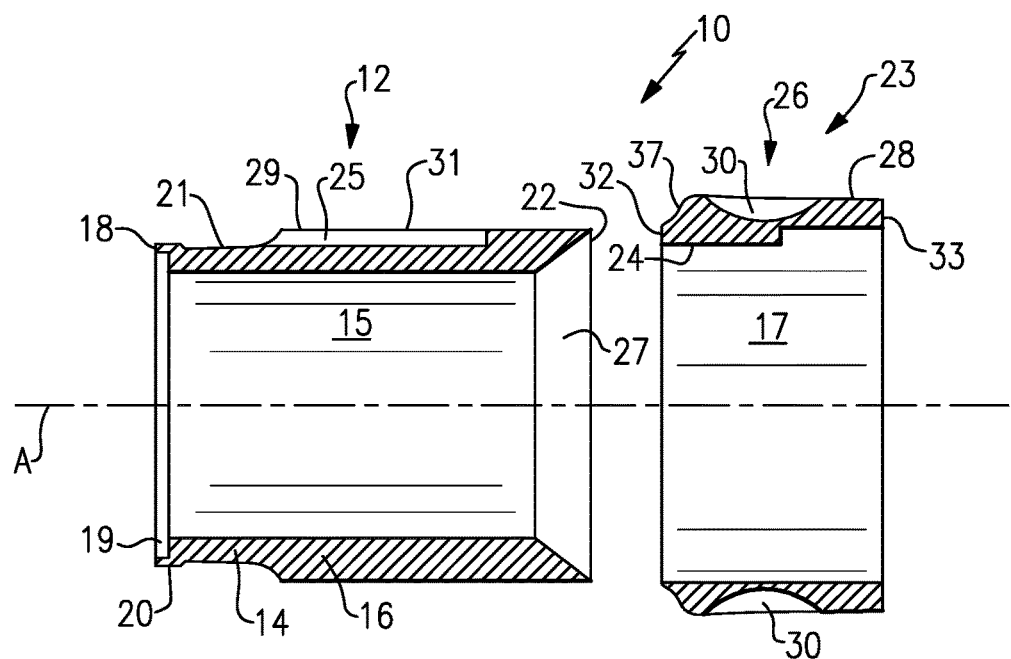
FIG. 1B is a cross-sectional view of the fitting of FIG. 1A.

FIG. 1A illustrates a perspective view of a fitting 10 for a tubular assembly. FIG. 1B is a cross-sectional view of the fitting 10. In this embodiment, the fitting 10 includes a base member 12 and is shown as a ferrule. However, other fittings, connectors and couplings are contemplated including elbows, t-connectors, union crosses, reducers, and adapters.

The base member 12 includes a first tubular portion 14 located at a first end 18 and a second tubular portion 16 located at a second end 22. The base member 12 defines a first bore 15 extending between the first and second ends 18, 22 along a longitudinal axis A. The first tubular portion 14 may define an inner tubular groove 19 extending from the first end 18 for receiving an end of a tube. The first tubular portion 14 may also include a lip 20 at the first end 18 and may include a first taper 21 extending from the lip 20 to the second tubular portion 16. The second tubular portion 16 may include a second taper 31 extending from the first tubular portion 14 toward the second end 22. The second tubular portion 16 defines a conical seat 27 extending from the second end 22.

Each of the first and second tubular portions 14, 16 can be made of stainless steels, nickel (including alloys), titanium (including alloys) or other materials depending on requirements. Each of the first and second tubular portions 14, 16 can be made by machining, forging, casting or other methods depending on materials used and fitting specifications.

The fitting 10 also includes a retaining band 23. The retaining band 23 includes a generally circular configuration and defines a second bore 17 for receiving a portion of the base member 12 therein. The retaining band 23 is configured to extend at least partially from the second end 22 toward the first tubular portion 14 and about the second tubular portion 16. However, it is contemplated that the retaining band 23 may extend any length between the first and second ends 18, 22.

The retaining band 23 may include a key 24 located at the proximal end 32 and extending radially inward from the second bore 17 (shown in FIG. 1B). The key 24 is configured to be inserted into a locating feature located on the outer surface 29 of the base member 12 for minimizing relative rotation between the retaining band 23 and the base member 12. The locating feature as shown is a slot 25 extending from the first tubular portion 14 to the second end 22. However, other configurations and locations of the locating feature 25 are contemplated. In another embodiment, the second tubular portion 16 and the retaining band 23 cooperate to define an interference fit to minimize relative rotation between the retaining band 23 and the base member 12, thereby eliminating the need of a key and a locating feature. The retaining band 23 may be press fit around or molded over the base member 12. The retaining band 23 may also be formed as a continuous piece or multiple of pieces.

The retaining band 23 defines an engagement feature 26 on a radially outward surface 28 thereof. The engagement feature 26 may extend radially outward or radially inward from the outward surface 28 of the retaining band 23. The engagement feature 26 may include a plurality of pockets 30 spaced circumferentially around the retaining band 23 and extending radially inward from the outward surface 28. The pockets 30 may be equally spaced apart or may be spaced at unequal distances from each other. The engagement features 30 are located between a proximal end 32 and a distal end 33 of the retaining band 23. The pockets 30 may be located closer to the proximal end 32 than the distal end 33 of the retaining band 23 to lessen stress levels in second end 22 of the base member 12. Other sizes, shapes, number and placement of the pockets 30 are contemplated. The engagement feature 26 may include other configurations than the pockets 30, including one or more slots, grooves, bumps or raised protrusions. In another embodiment, the engagement feature 26 includes a plurality of pockets and bumps each extending from the outward surface 28 of the retaining band 23. The retaining band 23 also defines a shoulder 37 located near the proximal end 32.

Additionally, the retaining band 23 can be made of stainless steels, nickel (including alloys), titanium (including alloys) or other metals depending on requirements. The retaining band 23 can be made by machining, forging, casting or other methods depending on materials used and fitting specifications. The retaining band 23 may also include a material greater in hardness than the material of the base member 12.

Figure 2A:
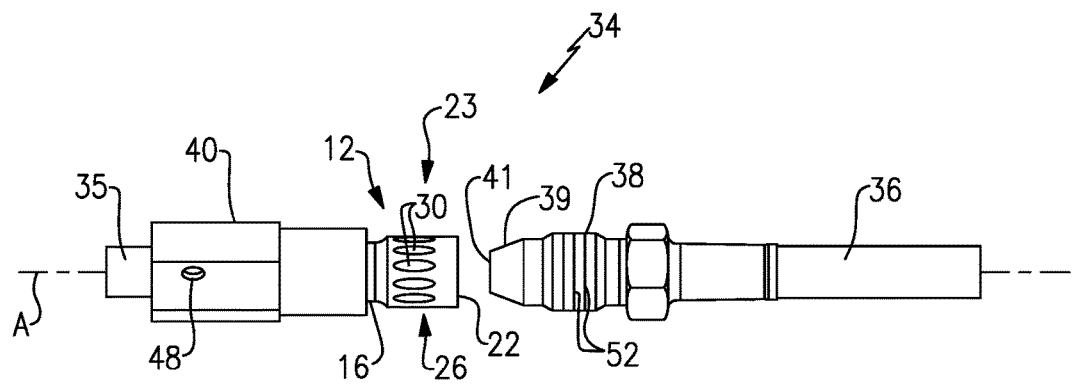
FIG. 2A is a perspective view of a first and second tube and the fitting of FIG. 1A-1B.
Figure 2B:
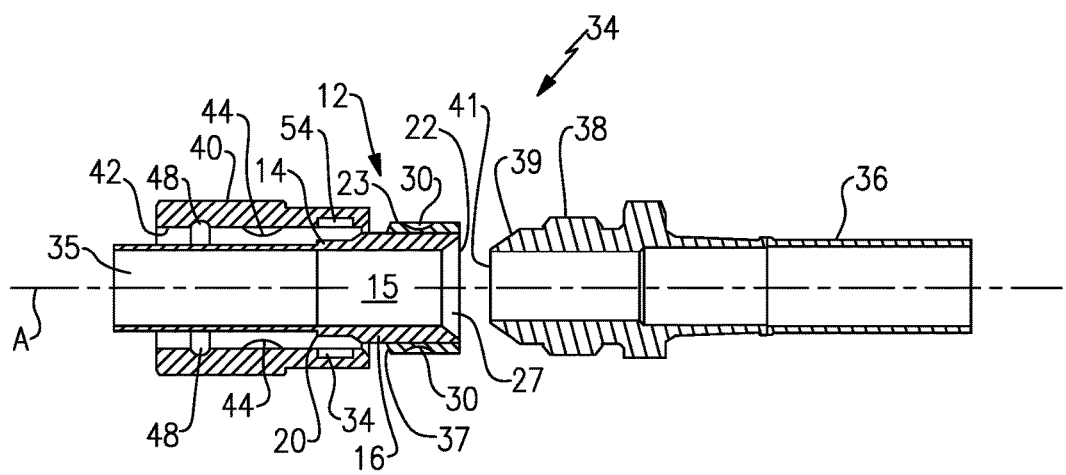
FIG. 2B is a cross sectional view of FIG. 2A.

FIGS. 2A-2B illustrates a tubular assembly 34 in an uninstalled position. The tubular assembly 34 includes a first tube 35 and a second tube 36 to be joined together with the fitting 10. The first tube 35 is inserted into the inner tubular groove 19 of the first tubular portion 14 (shown in 2B and 2D). The first tube 35 can be connected to the first tubular portion 14 by welding, brazing, inertia bonding, or by other conventional methods known in the art. In another embodiment, the first tube 35 is inserted over the lip 20. In yet another embodiment, the first tube 35 is connected to the end 18 of the first tubular portion 14. The second tube 36 is connected to a coupling member 38. The second tube 36 can be connected to the coupling member 38 by welding, brazing, inertia bonding, or by other conventional methods known in the art. The coupling member 38 defines a second interface 39 located at a third end 41 configured to be received at least partially within the first bore 15 of the base member 12 and adjacent to the first conical seat 27.

The tubular assembly 34 includes a fastening member 40 for fastening the first tube 35 and the second tube 36 to each other. The fastening member 40 may be configured as a nut for being engaged by a tool. The fastening member 40 defines a third bore 42 (shown in FIGS. 2B and 2D) for receiving a portion of the base member 12 and the retaining band 23 therein.

The fastening member 40 is moveable along longitudinal axis A to expose at least a portion of the second tubular portion 16. The retaining band 23 may be configured to prevent the fastening member 40 from extending in the axial direction past the distal end 33 of the retaining band 23. Accordingly, the fitting 10 is mostly exposed when the fastening member 40 and the coupling member 38 are disconnected (FIGS. 2A-2B).

The fastening member 40 includes a locking mechanism 44 extending radially inward from the third bore 42. The locking mechanism 44 may be a spring loaded part or any other part configured to engage the pockets 30 to secure the retaining band 23 to the fastening member 40. To allow for a smooth retraction of the fastening member 40 from the retaining band 23, the pockets 30 may be configured with an arcuate profile extending along the longitudinal axis A. The arcuate profile reduces the amount of force required to pull the locking mechanism 44 from the pockets 30 and allows for easier disassembly of the fastening member 40 from the retaining band 23. Additionally, the tension of the spring of the locking mechanism 44 may be configured to resist disengagement from the pockets 30, thereby minimizing axial movement of the fastening member 40 relative to the retaining band 23. In another embodiment, the locking mechanism 44 is located on the retaining band 23 and the engagement feature 26 is located on the fastening member 40.

Figure 2C:
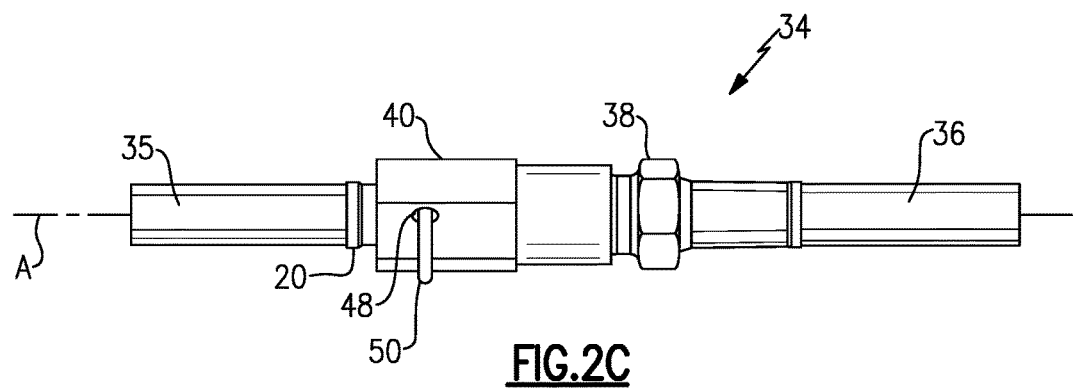
FIG. 2C is a perspective view of the first and second tubes of FIG. 2A joined by the fitting.
Figure 2D:
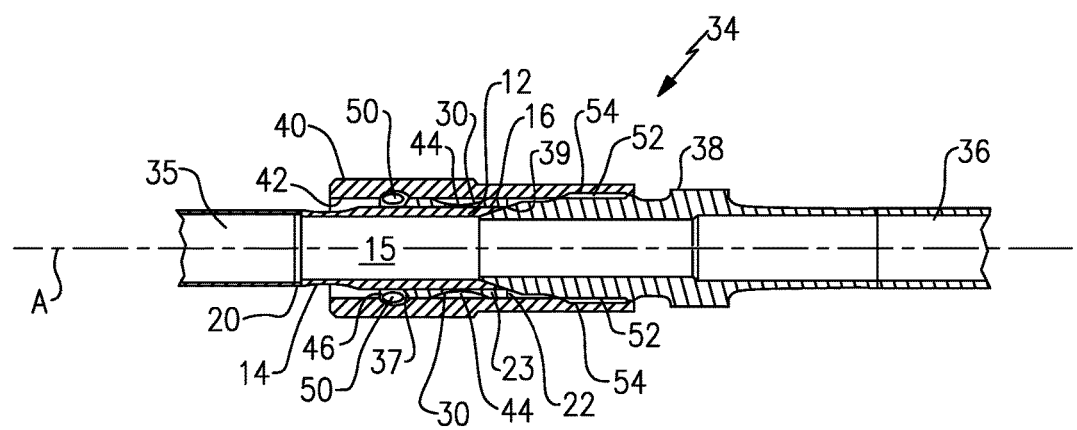
FIG. 2D is a cross-sectional view of FIG. 2C.

Referring to FIGS. 2C-2D, the fastening member 40 may define a channel 46 (shown in FIG. 2D) extending radially inward from the third bore 42. The fastening member 40 may also define a pair of orifices 48 for accessing the channel 46. A thrust wire 50 may be inserted into the channel 46 through the orifices 48 to minimize axial movement of the fastening member 40 toward the second end 22.

FIGS. 2C-2D illustrate the tubular assembly 34 in an installed position. To install the tubular assembly 34, the fastening member 40 is moved axially toward the second end 22 of the base member 12, causing the locking mechanism 44 to engage the pockets 30 of the retaining band 23. Accordingly, the locking mechanism 44 and the pockets 30 cooperate to minimize relative rotation of the fastening member 40 and the retaining band 23.

Thereafter, the coupling member 38 is inserted partially into the third bore 42 of the fastening member 40. The coupling member 38 includes a plurality of first threads 52 configured to engage a corresponding plurality of second threads 54 of the fastening member 40 when the coupling member 38 is rotated about the longitudinal axis A relative to the fastening member 40. The locking mechanism 44 and the pockets 30 cooperate to minimize relative rotation of the fastening member 40 about the longitudinal axis A while the coupling member 38 and the fastening member 40 are connected. In another embodiment, the locking mechanism 44 is configured to allow relative rotation of the fastening member 40 with respect to the retaining band 23 to secure the fastening member 40 to the coupling member 38.

After the coupling member 38 is connected to the fastening member 40, the thrust wire 50 is inserted into the channel 46 through the orifices 48. The thrust wire 50 engages the second taper 31 near the second tubular portion 16 and the shoulder 37 of the retaining band 23 to minimize axial movement of the fastening member 40. Accordingly, the locking mechanism 44 and the pockets 30, as well as the thrust wire 50, ensure that the first and second threads 52, 54 do not loosen or back off, securely connecting the first and second tubes 35, 36 to each other.

Although the different embodiments have the specific components shown in the illustrations, embodiments of this disclosure are not limited to those particular combinations. It is possible to use some of the components or features from one of the embodiments in combination with features or components from another one of the embodiments.

The preceding description is exemplary rather than limiting in nature. Variations and modifications to the disclosed embodiments may become apparent to those skilled in the art that do not necessarily depart from the essence of this disclosure. The scope of legal protection given to this disclosure can only be determined by studying the following claims.

What is claimed is:

1. A tubular assembly, said tubular assembly comprising:
a base member including a first end and a second end, said base member defining a first bore configured to receive a tube therein;
a retaining band defining a second bore for receiving a portion of said base member, said retaining band defining an engagement feature on a radially outward surface;
a coupling member configured to connect to a second tube; and
a fastening member defining a third bore for receiving a portion of said coupling member, said fastening member including a locking mechanism configured to engage said engagement feature of said retaining band to minimize relative rotation between said fastening member and said retaining band;
wherein said base member defines a locating feature and said retaining band includes a key configured to be inserted into said locating feature to minimize relative rotation between said retaining band and said base member;
comprising a thrust wire, wherein said fastening member defines an orifice for accessing a channel defined by said third bore, said channel configured to receive said thrust wire through said orifice, said thrust wire dimensioned to bound axial movement of said fastening member relative to the base member when said thrust wire is located in an installed position; and wherein said engagement feature includes a plurality of pockets extending radially inward and spaced circumferentially around said outward surface of said retaining band, each of said plurality of pockets having an arcuate profile, said locating feature being distinct from said plurality of pockets, said locating feature being configured to limit relative rotation between said retaining band and said base member, and said locking mechanism extends inwardly from surfaces of said third bore at a location that is spaced apart from opposed ends of said fastening member.

2. The tubular assembly of claim 1, wherein said engagement feature is symmetric about a longitudinal axis.

3. The tubular assembly of claim 1, wherein an outer surface of said base member includes a taper extending axially inward from said second end of said base member and configured to minimize relative axial movement between said base member and said retaining band.

4. The tubular assembly of claim 1, wherein said base member includes a first tubular portion located at said first end of said base member and a second tubular portion located at said second end of said base member.

5. The tubular assembly of claim 4, wherein said second tubular portion at least partially defines said engagement feature.

6. The tubular assembly of claim 1, wherein said base member includes a first material and said retaining band includes a second material different from said first material in hardness.

7. The tubular assembly of claim 1, wherein said retaining band is dimensioned such that each of said plurality of pockets is spaced apart from said first and second ends of said base member when said retaining band is located in said installed position, and said base member includes a first material and said retaining band includes a second material greater in hardness than said first material.

8. The tubular assembly of claim 1, wherein said locating feature is a longitudinal groove dimensioned to limit axial movement of the retaining band towards said second end of said base member configured to abut against said coupling member.

* * * * *